United States Patent

[11] 3,552,490

| [72] | Inventor | William W. Dollison |
| | | Dallas, Tex. |
| [21] | Appl. No. | 786,151 |
| [22] | Filed | Dec. 23, 1968 |
| [45] | Patented | Jan. 5, 1971 |
| [73] | Assignee | Otis Engineering Corporation |
| | | Dallas, Tex. |
| | | a corporation of Delaware |

[54] PRESSURE REGULATOR FOR WELL FLOW CONDUCTORS
19 Claims, 8 Drawing Figs.

[52] U.S. Cl. .................................................. 166/224,
137/498
[51] Int. Cl. ............................................... F21b 33/00,
F16k 31/12
[50] Field of Search .......................................... 166/224;
137/497, 498, 503, 505.38

[56] References Cited
UNITED STATES PATENTS

| 2,138,719 | 11/1938 | Wright .......................... | 137/498 |
| 2,821,209 | 1/1958 | Waterman ..................... | 137/498 |
| 3,090,443 | 5/1963 | Bostock ......................... | 166/224 |
| 3,411,584 | 11/1968 | Sizer et al. ..................... | 166/224 |
| 3,456,728 | 7/1969 | Chenoweth .................... | 166/224 |

Primary Examiner—James A. Leppink
Attorneys—E. Hastings Ackley and Walter J. Jagmin ABSTRACT: A pressure regulator for use for subsurface well installation for regulating surface pressure of the well having a valve member actuated by biasing means which may comprise compressed gas, a spring, or a combination thereof, to deliver a substantially constant predetermined downstream pressure. The valve is provided with structure permitting reverse flow and with means for damping movement of the valve element.

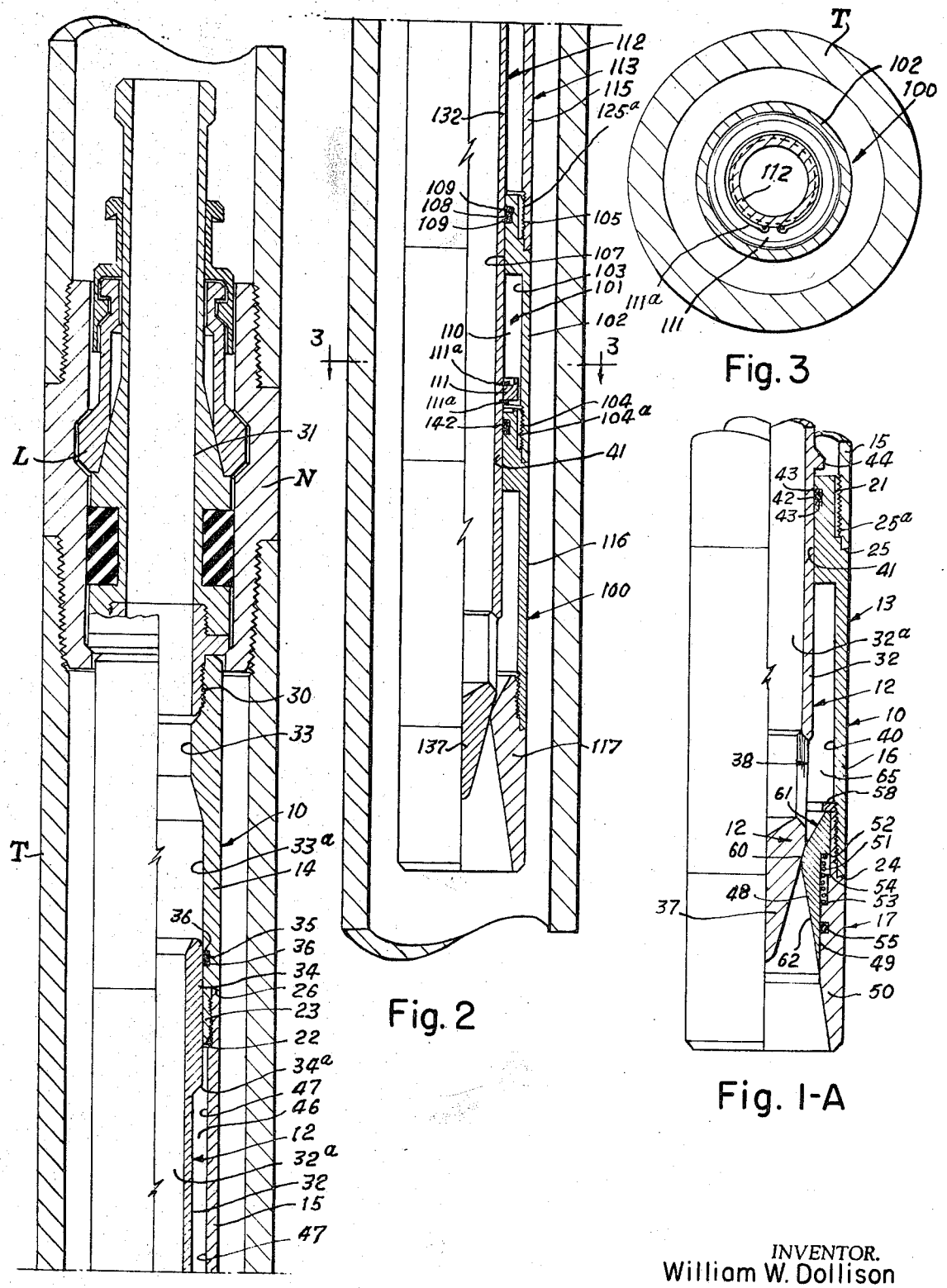

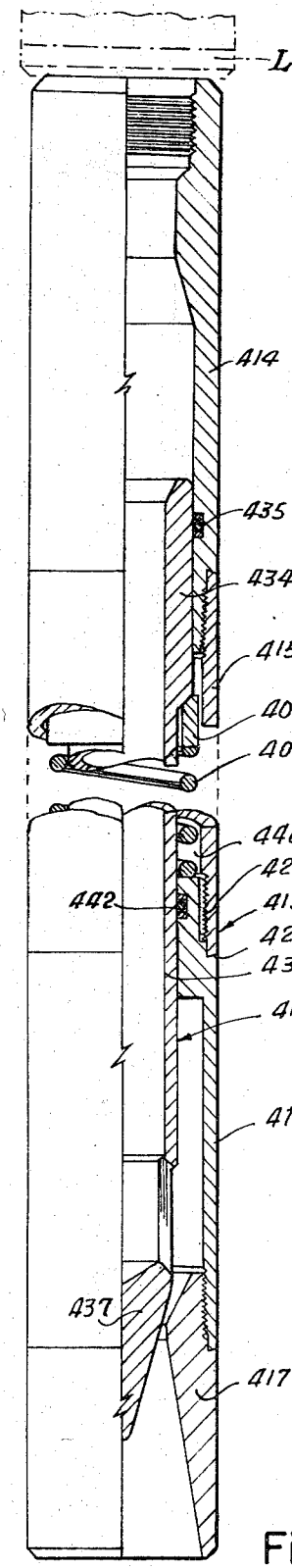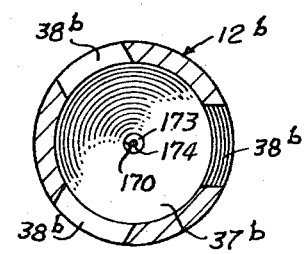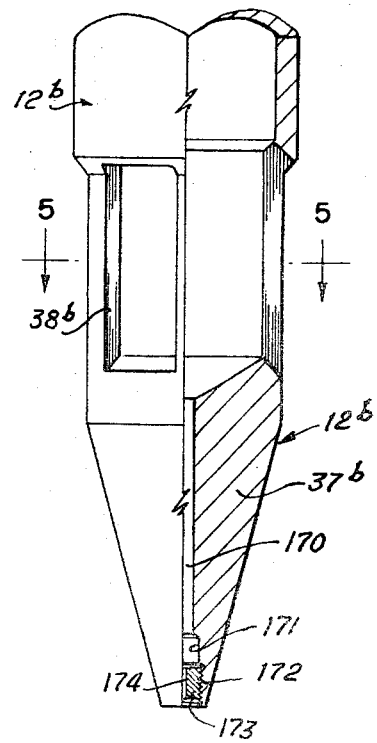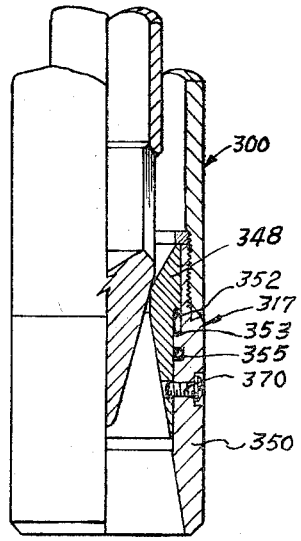
Fig. 5
Fig. 4
Fig. 6
Fig. 7
INVENTOR.
William W. Dollison

PRESSURE REGULATOR FOR WELL FLOW CONDUCTORS

This invention relates to well tools and in particular to a subsurface well tool for regulating the surface pressure of the well.

Regulators have been used for many years to reduce well surface pressures and in many cases to reduce gas-oil ratios; however, these regulators have usually been back pressure valves designed and adjusted to maintain a constant pressure drop thereacross. It is often desirable to maintain the well surface pressure at a substantially constant predetermined lowered value.

It is therefore one object of this invention to provide a subsurface flow regulator which will deliver a substantially constant predetermined downstream pressure.

A further object is to provide a regulator of the character described having an annular sealed chamber containing biasing means responsive to downstream pressure, and wherein said biasing means may comprise compressed gas, a spring, or a combination of a spring and compressed gas.

A still further object is to provide a regulator of the character described which provides for reverse flow therethrough at small differentials to enable pumping into the well when desired, as when it is desired to load the well with fluids to "kill" the well or for other purposes.

Another object is to provide a regulator of the character described having means for damping movement of the valve elements to prevent damaging effects caused by snap action or chatter.

Other objects and advantages will become apparent upon reading the description which follows and studying the accompanying drawings wherein:

FIG. 1 is a view partly in section and partly in elevation showing the upper part of a preferred embodiment of the gas-charged constant pressure regulator of the invention;

FIG. 1A is a view similar to FIG. 1, showing the lower portion of the regulator;

FIG. 2 is a view similar to FIG. 1 showing the lower portion of a modified form of the regulator having a dashpot or damping means incorporated therein;

FIG. 3 is a cross-sectional view taken along the line 3—3 of FIG. 2;

FIG. 4 is an enlarged fragmentary view, partly in elevation and partly in section, of a modified form of valve which can be used in the regulators of FIGS. 1 and 2;

FIG. 5 is a cross-sectional view taken along the line 5—5 of FIG. 4;

FIG. 6 is a fragmentary view of the lower portion of a modified form of regulator having a valve seat yieldably held in place by a shear pin or screw;

FIG. 7 is a view, partly in elevation and partly in section, of a modified form of the regulator of this invention.

In the drawings, FIGS. 1 and 1A, a pressure regulator 10 is shown mounted on and supported by a locking and sealing device L, and disposed in a landing nipple N in a well flow conductor or tubing string T. The regulator comprises an elongate valve member 12 mounted for limited longitudinal reciprocal movement within a housing 13 made up of an upper sub 14, chamber housing 15, lower sub 16, and seat assembly 17. The seat assembly is externally threaded at its reduced upper end 20, as shown in FIG. 1A, for attachment to the lower end of the lower sub 16 as shown in FIG. 1A. The reduced upper end 21 of the lower sub 16 is similarly externally threaded for attachment to the lower end of the chamber housing 15 (FIG. 1A) and the upper end of the chamber housing 15 is internally threaded as at 22 to receive the externally threaded lower end portion 23 of the upper sub 14. Each of these threaded connections are sealed by the metal-to-metal contact of their beveled mating sealing shoulders as at juncture 24, 25 and 26. The upper end of the upper sub 14 is internally threaded as at 30 so that the flow regulator can be attached to the lower end of the mandrel 31 of a suitable locking and sealing device L used to anchor this flow control device in the landing nipple N of the well flow conduit T.

One common and well-known locking device L and landing nipple N suitable for suspending this flow regulator in a flow conduit is the Otis type N mandrel assembly and landing nipple illustrated on page 3663 of the Composite Catalog of Oil Field Equipment and Services, 1964—65 Edition, and these will not be further described herein.

The central bore 33 of the upper sub is enlarged as at 33a to receive the upper enlarged end portion or piston head 34 at the upper end of the elongate tubular upper portion 32 of the valve member as shown in FIG. 1. An o-ring or other suitable seal 35 disposed between a pair of antiextrusion rings 36 and positioned in a suitable internal annular groove formed in the bore wall of the upper sub 14 seals between the piston head of the valve member and the upper sub.

The upper portion 41 of the bore 41 of the bore 40 of the lower sub 16 is reduced to form a fairly close fit around the central portion of the tubular portion of the valve member 12 and a suitable o-ring seaL 42 positioned between a pair of antiextrusion rings 43 and disposed in a suitable internal annular groove in this wall of the reduced bore 41 of the lower sub seals between the lower sub and the central portion of the valve member. Thus, an annular sealed chamber 46 is formed between the bore wall 47 of the chamber housing 15 and exterior of the valve member, and between the lower end of the bore wall of the upper sub 14 and the upper piston head of the valve member. This sealed chamber 46 is charged with a quantity of compressible gas, and, since the area sealed by the o-ring seal 35 is greater than the area sealed by the o-ring 42, which is the annular area of the beveled shoulder 34a at the lower end of the piston head 34, the gas charge biases the valve member 12 upwardly. An external annular stop flange 44 is formed on the midportion of the tubular portion 32 of the valve member and is disposed to engage the shoulder at the upper end of the reduced upper portion 21 of the lower sub 16 to limit downward movement of the valve member 12 and to prevent the piston head 33 on the upper end of the valve member from moving below the seal ring 35 in the upper sub 14. The elongate tapered closure member or nose 37 is formed on the lower end of the valve member 12, and a plurality of large lateral inlet ports or windows 38 are formed in the lower portion of the wall of the tubular portion 32 of the valve member for admitting fluids into the bore of the valve member above the closure member 37.

The seat assembly 17 includes a tubular seat member 48 having its reduced lower portion 49 slidable in the bore of a seat housing 50 is biased upwardly by a spring 51 confined between a downwardly facing shoulder 52 at the upper end of the reduced portion 48 of the seat member and an upwardly facing shoulder 53 at the lower end of the enlarged upper portion 54 of the bore of the housing 50. A suitable o-ring 55 seals between the housing 50 and the seat 48. Upward movement of the seat is limited by a threaded stop ring 58 threaded into the threads at the lower end of the bore 40 of the lower sub 16 and locked therein by engagement of the upper end of the reduced upper end portion 20 of the housing 50, while downward movement of the seat is limited by the engagement of its external downwardly facing shoulder 52 with a corresponding upwardly facing shoulder 54 formed in the reduced upper bore of the seat housing. During normal operations, when the regulator is closed, the valve member will be in its lowermost position, with the flange 44 resting against the upper end of the lower sub 16 and the closure member 37 seated on the annular seat 60 formed at the reduced midportion of the divergently flared bores 61 and 62 of the seat member 48. In this condition, the valve seat 48 will be depressed only slightly. When it becomes necessary to pump fluids through the regulator to kill the well, the pressure of the pumped fluids acting from above will move the valve seat 48 downwardly to its lower position thus creating a flow passage between the vaLve and seat, permitting the pumped fluids to pass therethrough.

When the regulator is installed in a well conduit T, the locking mandrel assembly L from which it is suspended is provided with means for sealing between the exterior of the mandrel and the interior of the well conduit, thus compelling any flow to take place through the bore of the regulator rather than around it.

When the valve member 12 is at its lowermost position in which its nose 37 is in engagement with the seat 60 of the seat member 48, the bore through the seat is sealed off and flow through the regulator is prevented. However, when the valve member is moved upwardly, flow may take place between the seat 60 and the nose 37 of the valve member. Flowing fluids move upwardly through the seat, enter the annular chamber 65 formed between the bore 40 of the lower sub and the exterior of the valve member and from this chamber pass through the lateral windows 38 of the valve member, enter the bore 32a of the valve member and flow therefrom upwardly through the bore 33 of the upper sub and through the central flow passage of the locking mandrel L and to the surface through the well conduit T.

When the pressure existing above the upper end of the piston head 34 of the valve member exerts a downward force thereon sufficient to overcome an opposing force exerted by the compressed gas in the charge chamber, the valve will be moved to the closed position. Similarly, when the upward force on the piston head of the valve member due to the gas charge in the chamber is sufficient to overcome the opposing downward force due to the pressure in the bore 33a of the upper sub above the piston head 34 of the valve member, the valve member will be moved upwardly to permit flow to take place upwardly through the regulator. Thus, if the downstream pressure existing above the valve member becomes a little low, the valve will open up to increase the flow rate and when this downstream pressure becomes a little high, the valve will close, or pinch the flow slightly to decrease the flow rate. Thus, the regulator will respond to the downstream pressure, tending to maintain such pressure at a substantially constant predetermined value even though the withdrawal rate from the well is varied within a reasonable range.

A modified form of the regulator 100 is illustrated in FIG. 2 and is similar to that illustrated in FIGS. 1 and 1A with the exception that a simple valve seat member 117 is used and that a dashpot assembly 101 is provided therein to damp or slow the action of the regulator valve member 112 to prevent damage to the valve closure member 137 and the seat 117 due to chatter.

The dashpot assembly 101 includes a dashpot cylinder 102 made up in the regulator housing 113. The bore 103 of the cylinder is internally threaded at its lower end, as at 104, to receive the upper threaded end portion of the lower sub 116, while the upper end of the dashpot cylinder is externally threaded as at 105, for attachment to the lower end of the chamber housing 15. The upper end 107 of the bore 106 of the cylinder 102 is reduced to provide a close sliding fit around the tubular central portion 132 of the valve member 112 and a seal means comprising an o-ring 108 flanked by a pair of antiextrusion rings 109 is disposed in a suitable internal annular groove in the reduced upper bore 107 and seals between the dashpot cylinder and the exterior of the valve member. Thus, the bore 103 of the dashpot cylinder forms a chamber 110 between the cylinder member and the valve which is sealed at its upper end by the seal means 108 and at its lower end by the seal means 142.

The valve member 112 is provided with a dashpot piston 111 positioned between a pair of snap rings 111a disposed in suitable annular grooves formed in the exterior surface of the valve member as shown, and the dashpot piston 111 therefore will reciprocate in the chamber 110 with movement of the valve member. The outside diameter of the dashpot piston 111 has a fairly close sliding fit in the bore 103 of the cylinder and the inside diameter of the piston is a close fit upon the exterior of the valve member, thus minimizing the fluid bypass area around the piston The chamber 110 is filled or almost filled to capacity with a liquid, such as oil. As the piston 111 reciprocates in the chamber, it can do so only as this liquid is transferred from one side of the piston to the other, and the action of the piston therefore is damped, since the flow of oil through the restricted bypass areas amounts to a considerable resistance to the valve movement. The dashpot piston and cylinder will thus cause the valve member to move so slowly that the valve closure member 137 cannot batter the seat 117. Also, the engagement of the closure member with the seat limits downward movement of the valve member 112 so that the dashpot will not strike the upper end of the lower sub 116.

In other structural respects, the parts of the regulator 100 are the same as the regulator 10 of FIG. 1 and 1A, and are given the same numerals.

Should it be desired to provide either form of the regulator with a closure member which will not seal off perfectly but which will allow a very low rate of flow even though the valve member is closed, a valve member 12b, shown in FIG. 4, can be provided. The closure member 37b of this valve member is provided with a small central passage 170 whose lower portion 171 is enlarged and threaded as at 172 to receive a bean or choke 173 provided with a small orifice 174 of the desired size to permit the desired rate of flow. Thus, even though the closure member 37b is on seat, fluids can still flow through the orifice 174 and the passage 170.

In FIG. 6, the lower portion of a modified form of regulator 300 is illustrated, having a modified seat assembly 317. The seat assembly is very similar to the seat assembly 17 of FIG. 1A, but the seat member 348 is held in an upper position in the seat housing 350 by at least one suitable shear pin or shear screw, such as the screw 370 threaded in a suitable aperture 371 in the housing and having its end extending into an aligned aperture in the seat member 348. An O-ring 355 is disposed in a suitable internal groove in the housing to seal between the housing and the seat. Upward movement of the seat member in the housing is prevented or limited by the threaded ring 350, as shown. The shear screw 370, of which any number of any suitable material may be used to produce the proper strength, must be sufficiently strong so that it will not shear during normal operations when the valve is pressed downwardly against the seat by high pressures existing downstream of the regulator. When, however, it becomes desirable to pump into the well, fluids are pumped into the tubing above the regulator and the pressure is built up until the downward force acting upon the valve member and seat member becomes sufficient to shear the screw or screws and move the valve seat member downwardly. Downward movement of the seat is limited by engagement of its external downwardly facing shoulder 352 with the upwardly facing shoulder 353 formed in the bore of the seat housing. When the screw shears, downward movement of the valve member 12 is arrested by the stop flange 44 before that of the valve seat member 348, thus creating an opening between the valve closure member 37 and seat member 348 through which fluids can be pumped.

In FIG. 7, a further modified form of regulator 400 is shown which comprises an upper sub 414, a chamber housing 415, and a lower sub 416 screwed together to form a housing 413, in which a valve member 412 is slidably disposed. The housing is provided with suitable seals, such as o-rings 435 and 442, which seal between the upper sub and the piston head 434 above the charge chamber 446, and between the lower sub and the central tubular portion 432 of the valve member below the charge chamber.

A spring 402 is disposed about the valve member within the chamber 446 with its lower end supported by the upper end of the lower sub 416 and with its upper end bearing upwardly against the lower end of an adjusting spacer ring 404 whose upper inwardly and downwardly beveled end engages the downwardly facing beveled shoulder 434a at the lower end of the enlarged upper or piston portion 434 of the valve member. Thus, the compression of the spring 402 biases the valve member upwardly relative to the housing and therefore relative to the fixed seat 417 at the lower end of the housing.

The force applied by the spring 402 can be varied by varying the length of the adjusting spacer ring 404 as desired, by selecting a stronger or weaker spring. Too, it is plain to see that since the chamber 446 is and must be sealed, the chamber can be provided with a charge of compressible gas in addition to the spring, so that the forces of the spring and gas will combine to bias the valve member upwardly toward open position.

Thus, the chamber 446 may be provided with valve biasing means which may comprise gas alone, a spring along, or a combination of the two. It is well known that, due to changes in temperature, the gas pressure in the chamber will vary considerably, but that temperature changes affect the spring force only a negligible amount. Therefore, it may be desirable to utilize a spring in the charge chamber should the temperature effects on the gas be objectionable. Generally, however, the gas charge without the spring will be preferred.

To charge any of the embodiments of this invention with gas, the assembled valve is placed in a fixture so that a pair of seals straddle the juncture 25 between the chamber housing 15 and the lower sub 16, and gas is injected through the wall of the fixture and between the two seals. The threaded joint at the juncture is left loosened and gas will pass the loosened threaded joint and enter the chamber 46. When the chamber becomes charged to the desired pressure, the thread is tightened, sealing the chamber. To aid in this charging operation the upper threaded end portion 21 of the lower sub 16 may be provided with a longitudinal external groove 25a to provide a free passage for the gas to enter the chamber through the loosened joint. The beveled metal-to-metal seal at the juncture 25 prevents leakage from the chamber. Also, in the form of FIG. 2, a groove 104a may be provided in the threaded upper end of the lower sub 116 to facilitate filling the dashpot chamber 110 with oil or other damping fluid.

Thus, an improved regulator has been provided having a chamber which can be charged with gas, a spring, or a combination of the two, and which will regulate the downstream pressure to a more or less constant predetermined level; and such regulator may be provided with a dashpot assembly which will damp the action of the regulator valve member to prevent chatter and damage caused thereby. Further, the regulator may be provided with a seat assembly structure which will allow pumping into the well should it become necessary to do so; and the regulator may be provided with a valve member having a small passage therethrough to permit a small rate of flow even when the regulator valve is closed.

The foregoing description of the invention is explanatory only, and changes in the details of the construction illustrated may be made by those skilled in the art, within the scope of the appended claims, without departing from the spirit of the invention.

I claim:

1. A well tool including: an elongate housing having means for supporting it in a flow conductor, said housing having a fluid flow passage therethrough; annular seat means in said housing having flow communication with said flow passage; elongate valve means movable longitudinally in said housing and having a closure member engageable with and coacting with said seat means for controlling flow through said flow passage; means providing a closed chamber in said housing between said housing and said valve means; biasing means in said chamber biasing said valve means away from said seat means to open said flow passage to flow therethrough; and means on said valve means exposed to fluid pressure in said flow passage downstream of said seat means for actuating said valve means by such fluid pressure toward said seat means to close off flow through said flow passage when said downstream fluid pressure equals or exceeds a predetermined value.

2. A well tool of the character set forth in claim 1 wherein said seat means includes: a seat-housing member; a seat member slidably movable longitudinally in said seat-housing member; means yieldably restraining said seat member against movement with respect to said seat-housing member in a position to be engaged by said valve means to control flow through the flow passage in said elongate housing; and means limiting longitudinal movement of said valve means toward said seat member, said seat member being movable in said seat-housing member away from said valve means to permit fluid flow through said seat member.

3. A well tool of the character set forth in claim 2 wherein said means yieldably restraining said seat member against movement in said seat-housing member comprises spring means confined between said seat-housing member and said seat member and biasing said seat member to said position to be engaged by said valve means to control flow through said flow passage of said elongate housing.

4. A well tool of the character set forth in claim 2 wherein said means yieldably restraining said seat member against movement in said seat-housing member comprises shear means connecting said seat member and said seat-housing member and yieldably upon application of a predetermined force to said seat member to permit said seat member to move away from said valve means.

5. A well tool of the character set forth in claim 1 wherein said biasing means comprises a charge of gaseous fluid confined in said chamber and acting on said valve means to bias said valve means away from said seat means toward open position.

6. A well tool of the character set forth in claim 1 wherein said biasing means in said chamber comprises spring means confined in said chamber between said housing and said valve means and biasing said valve means away from said seat means toward open position.

7. A well tool of the character set forth in claim 1 wherein said biasing means comprising a charge of gaseous fluid and spring means confined in said chamber between said housing and said valve means and acting on said valve means to bias said valve means away from said seat means toward open position.

8. A well tool of the character set forth in claim 1 wherein a restricted flow orifice is provided in said closure member of said valve means to permit limited flow through said closure member in either direction while said closure member is engaged with said seat means.

9. A well tool of the character set forth in claim 1, including: means providing a second closed chamber in said housing between said housing and said valve means; piston means on said valve means movable longitudinally with said valve means in said second chamber; and damping fluid confined in said second chamber damping movement of said piston in said second chamber to damp longitudinal movement of said valve means in said housing.

10. A well tool of the character set forth in claim 1 wherein said valve means includes an elongate tubular portion connected with said closure member and providing a flow passage in said valve means communicating with the flow passage of said housing to permit fluid flow therethrough.

11. A flowing fluid pressure regulator valve for wells including: an elongate housing adapted to be mounted in a well flow conductor and having a longitudinal fluid flow passage therethrough adapted to communicate with said flow conductor; annular valve seat mean in said housing having flow communication with said flow passage; elongate tubular valve means slidably movable longitudinally in said housing downstream of said seat means and having a closure member at one end movable into and out of engagement with said seat means for controlling flow therethrough; lateral port means in said tubular valve means adjacent said closure member for flow communication between the interior and the exterior of said tubular valve means adjacent said closure member; means sealing between said tubular valve means and said housing longitudinally spaced from said lateral port means and on the opposite side of said port means from said closure member, whereby fluids flowing through said housing flow passage are directed into and through said tubular valve means; piston head means on said tubular valve means spaced from said closure member and exposed to fluid pressure in said housing flow passage downstream of said closure member whereby such downstream fluid pressure tends to move said valve member in said housing to move said closure member into engagement with said seat means; and biasing means in said housing between said housing and said tubular valve means acting on said valve means to bias said valve means away from said seat means.

12. A valve of the character set forth in claim 11 including: means providing a sealed chamber in said housing between said housing and said tubular valve means, said piston head means on said valve means having a portion exposed in said chamber; and wherein said biasing means is confined in said chamber and acts on said piston head means of said valve means to bias said valve closure member away from said seat means to permit flow through said flow passage.

13. A well tool of the character set forth in claim 11 wherein said seat means includes: a seat-housing member; a seat member slidably movable longitudinally in said seat-housing member; means yieldably restraining said seat member against movement with respect to said seat-housing member in a position to be engaged by said valve means to control flow through the flow passage in said elongate housing; and means limiting longitudinal movement of said valve means toward said seat member, said seat member being movable in said seat-housing member away from said valve means to permit fluid flow through said seat member.

14. A well tool of the character set forth in claim 13 wherein said means yieldably restraining said seat member against movement in said seat-housing member comprises spring means confined between said seat-housing member and said seat member and biasing said seat member to said position to be engaged by said valve means to control flow through said flow passage of said elongate housing.

15. A well tool of the character set forth in claim 13 wherein said means yieldably restraining said seat member against movement in said seat-housing member comprises shear means connecting said seat member and said seat-housing member and yieldable upon application of a predetermined force to said seat member to permit said seat member to move away from said valve means.

16. A well tool of the character set forth in claim 12 wherein said biasing means comprises a charge of gaseous fluid confined in said chamber and acting on said piston head means to bias said valve means away from said seat means toward open position.

17. A well tool of the character set forth in claim 12 wherein said biasing means in said chamber comprises spring means confined in said chamber between said housing and said piston head means and biasing said valve means away from said seat means toward open position.

18. A well tool of the character set forth in claim 12 wherein said biasing means comprising a charge of gaseous fluid and spring means confined in said chamber between said housing and said piston head means and acting on said piston head means to bias said valve means away from said seat means toward open position.

19. A well tool of the character set forth in claim 11 including: means providing a closed damping chamber in said housing between said housing and said valve means; piston means on said valve means movable longitudinally with said valve means in said second chamber; and damping fluid confined in said closed damping chamber damping movement of said piston in said damping chamber to damp longitudinal movement of said valve means to said housing.